Oct. 25, 1949.  G. W. HAWKINS  2,485,880
COMBINATION HEATER, COFFEE TABLE AND TRAY
Filed Feb. 20, 1946   2 Sheets-Sheet 1

INVENTOR.
George W. Hawkins

BY Darby & Darby
ATTORNEYS

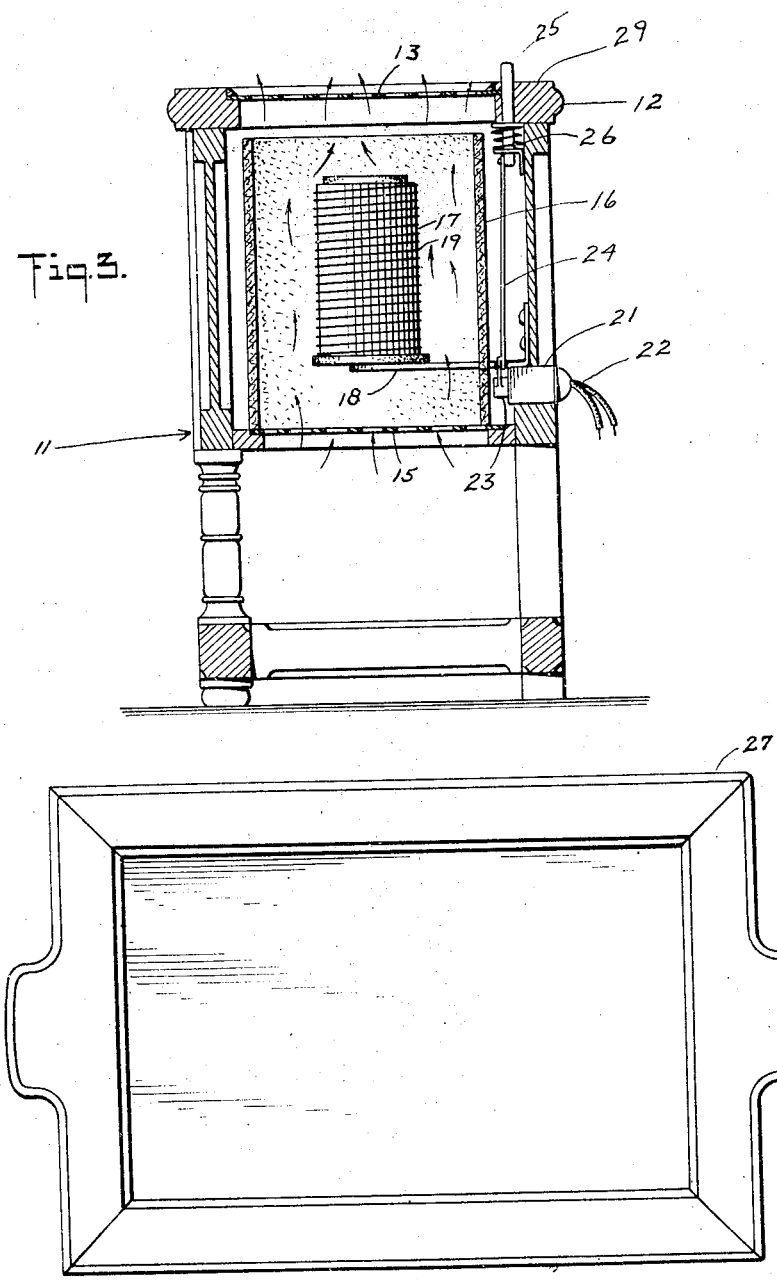

Patented Oct. 25, 1949

2,485,880

UNITED STATES PATENT OFFICE 2,485,880

COMBINATION HEATER, COFFEE TABLE, AND TRAY

George W. Hawkins, Forest Hills, N. Y., assignor, by mesne assignments, to Frank J. Stevens, Chattanooga, Tenn.

Application February 20, 1946, Serial No. 649,045

3 Claims. (Cl. 219—19)

This invention relates to articles of furniture and particularly to a combination heater, coffee table or end table, and tray.

It is an object of this invention to provide a beautiful piece of furniture which will also have an additional function in a house.

Another object is to provide a heater for a room, the elements of which may be concealed.

A further object is to provide a combination heater, coffee table and tray.

Additional objects will be apparent after a study of the following description, claims and drawings, in which—

Figure 3 is a cross-sectional view through 3—3 of Figure 2; and

Figure 4 is a plan view of the tray.

Figure 1:
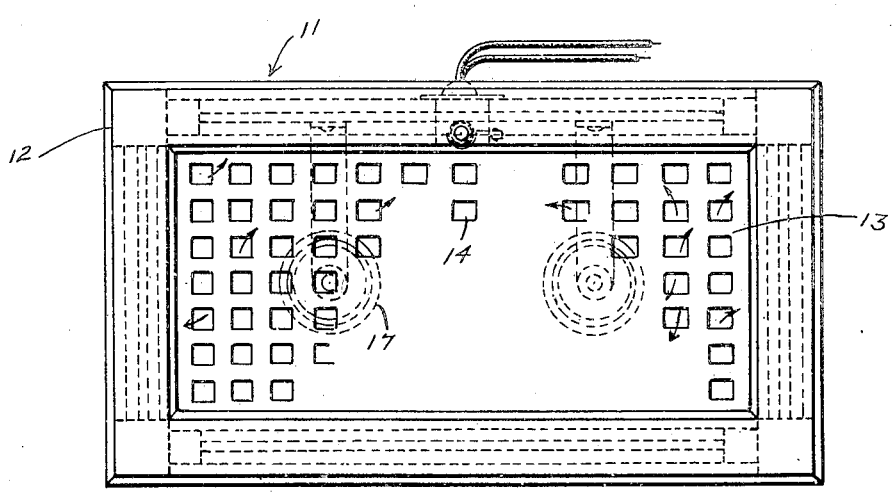
Figure 1 is a top view of the coffee table with the tray removed.
Figure 2:
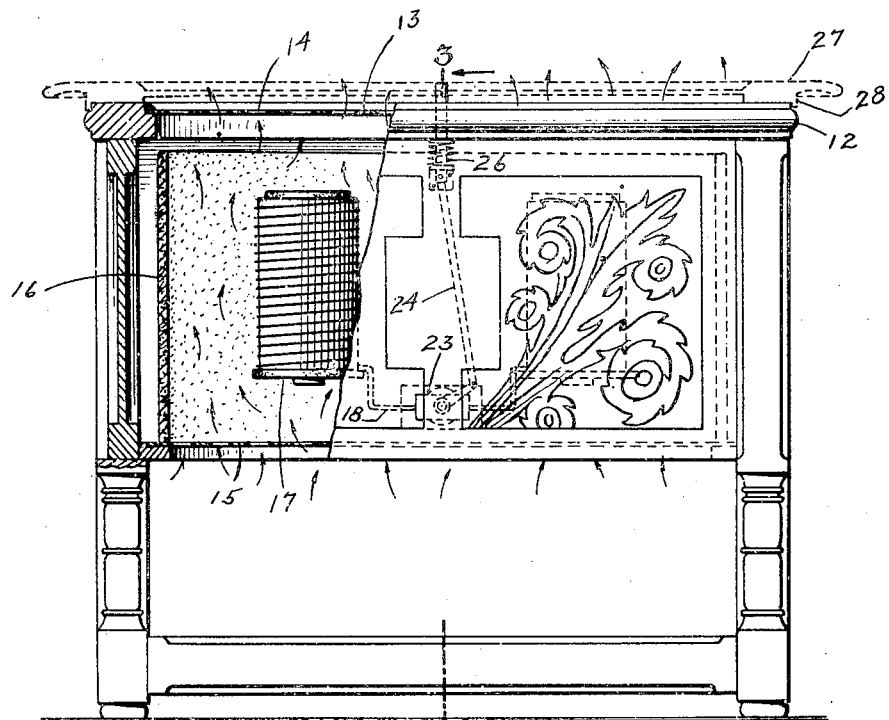
Figure 2 is a side view partially cut away showing the coffee table with the heated mounted therein and the tray in position.

Referring now in more detail to Figures 1 and 2, there is seen a coffee table 11. Around the top of the table 11 is a border 12. Mounted within the enclosure of border 12, on a suitable ledge, is a plate 13 which may be of a material such as brass. Plate 13 is perforated throughout its surface forming a large number of openings 14.

For the sake of appearance, it is desirable that the sides of the upper half of the table be enclosed. These side panels may have a design on the outer face adding to the appearance. Although the sides are enclosed the top and bottom are left open. Across the bottom of the enclosure on a suitable ledge is mounted a second plate 15 which may be identical to plate 13. Plate 15 is also perforated with a large number of holes.

Within the box-like structure thus formed there are mounted four walls 16 of insulating material open at top and bottom. Walls 16 are mounted within the box-like structure of table 11 so as to be centered over the openings of plates 13 and 15. The structure formed by insulated walls 16 is slightly smaller in circumference than the box-like structure of table 11 leaving an air space between wall 16 and the side of table 11.

It has been found that walls 16 a half inch in thickness are satisfactory. However, other dimensions may be more suitable depending upon the particular use.

Mounted within insulated walls 16 are heater coils 17. Coils 17 should be mounted on end on a suitable brace 18 attached to one of the walls of table 11. Coil 17 is composed of a suitable cylindrical form about which is wound a number of electrical heater type wires 19 forming a helical coil, as may be seen in Figures 2 and 3. An outlet socket 21 is provided in the wall of table 11 furnishing the electrical connection for coil 17. An extension cord 22 may thus be plugged in socket 21 furnishing the necessary electrical power for operation of the heater.

Two heater coils are preferably furnished mounted on either side of center of table 11, as shown in Figures 1 and 2. The number of coils, however, is purely arbitrary and may vary with the size of table 11. The amount of heat necessary for the particular room in which this structure is to be used may also be a determining factor.

With the structure thus described it may be seen that cold air entering through the underside of table 11 through the holes of plate 15 passes within the insulated structure formed by wall 16 and by coil 17. This entire area is heated by heater 17. The heated air then passes out the top through holes 14 of plate 13.

Mounted preferably to socket 21 is an electrical switch 23. Switch 23 may be attached through a pivotally mounted arm 24 to an upright prong 25. Prong 25 is mounted on a helical spring 26 and extends through the top of border 12, as may be seen in Figures 2 and 3. Prong 25 is slidably mounted in border 12 so that it may be readily pushed down with the top flush with the upper surface 29 of border 12. With prong 25 pushed downwardly the action of arm 24 turns electrical switch 23 thus cutting off the electrical power furnished to heater 17. On the other hand with prong 25 in the extended position as shown, switch 23 through the action of arm 24 makes electrical contact furnishing the necessary power to coil 17.

As mentioned above the upper surface 29 of border 12 is flat so that a suitable tray 27, as seen in Figure 4, may be placed thereon. Tray 27 is provided with a suitable contacting border to fit flush with surface 29 of border 12. Around the edge of the border of tray 27 is a downwardly extending lip or flange 28. Lip 28 is so positioned on the border of tray 27 that it will engage the edge of border 12 when the tray is placed on table 11. Lip 28 thus engaging the edge of border 12 furnishes a suitable lock holding the try in position when placed on table 11.

It may be readily seen that when tray 27 is so placed on table 11, the border thereof will press downwardly the prong 25. Thus when tray 27 is placed back on table 11 switch 23 is turned off.

When the tray is removed from the top of table 11, spring 26 pushes prong 25 up turning on switch 23 furnishing the electrical power to coil 17.

Thus when the tray is removed the heater begins to function and the air flows through the openings provided. However, when tray 27 is placed back on table 11 closing the openings 14 the electrical power is turned off.

With tray 27 in position a suitable top is provided completing the coffee table 11. Tray 27 may have any suitable design appealing to the aesthetic sense of the user.

While tray 27 completes the coffee table when in position, it may be used as a serving tray when removed.

Thus there is provided a coffee table with a removable tray which makes an attractive piece of furniture. At the same time there has been furnished a suitable heating means for the room which heating means is conveniently located so as not to be exposed to view. The operation of the heating unit is dependant on the use of the coffee table and tray.

While the specific embodiment of the invention has been described, it will be apparent that a great many modifications are possible without departing from the scope of the invention.

What is claimed is:

1. An article of furniture comprising, in combination, a coffee table the upper sides of which are enclosed, insulation sheets forming a second enclosure within the enclosure of said coffee table, each of said enclosures being open at the top and bottom, a first perforated plate covering the upper of said openings and a second perforated plate covering the lower of said openings, electrical heating coils within said insulated enclosure between said plates, an electrical switch for operating said heating coils, a removable flat tray forming the top of said table, and means for preventing sidewise movement of said tray when placed in position on said table, and spring operated mechanical means sensitive to the position of said tray, said mechanical means operating said electrical switch, to excite said heating coils when the tray is removed from its position on said table and to turn off said heating coils when said tray is placed in position on said table.

2. An article of furniture comprising, in combination, a coffee table having upper sides thereof forming an enclosure, a second enclosure formed of insulating material spaced inwardly of said table from said first named enclosure, both of said enclosures being open at the top and bottom, a perforated plate covering the openings at the top of said enclosures, a second perforated plate carrying said second enclosure and covering the openings at the bottom of said enclosures, an electrical heating unit within said second enclosure, switch means for operating said heating unit, a removable tray adapted to complete the top surface of said coffee table, and means responsive to the weight of the tray for operating said switch means; said tray when removed resulting in exciting said electrical heating unit and when placed in position on said table turning off said electrical heating unit.

3. An article of furniture comprising, in combination, a coffee table having upper sides thereof forming an enclosure, a second enclosure formed of insulating material spaced inwardly of said table from said first named enclosure, both of said enclosures being open at the top and bottom, a perforated plate covering the openings at the top of said enclosures, an electrical heating unit within said second enclosure and carried by said first named enclosure, switch means for operating said heating unit, a removable tray adapted to complete the top surface of said coffee table, and means responsive to the weight of said tray for operating said switch means; said tray when removed from said table resulting in said switch means being operated to excite said electrical heating unit and when placed in position on said table resulting in said switch means being operated to shut off said electrical heating unit.

GEORGE W. HAWKINS.

REFERENCES CITED

The following references are of record in the file of this patent:

UNITED STATES PATENTS

| Number | Name | Date |
| --- | --- | --- |
| 1,161,667 | Hays | Nov. 23, 1915 |
| 1,505,299 | Stirn | Aug. 19, 1924 |
| 1,654,860 | Carmean | Jan. 3, 1928 |